United States Patent [19]

Broun et al.

[11] Patent Number: 5,431,970
[45] Date of Patent: Jul. 11, 1995

[54] LAMINATE MATERIAL FOR PROTECTIVE BAGS AND CASES

[76] Inventors: Conway C. Broun, 1300 Crystal Hills Dr.; Franklin W. Range, 276 Woodlawn Ave., both of Athens, Ga. 30606

[21] Appl. No.: 105,338

[22] Filed: Aug. 11, 1993

[51] Int. Cl.⁶ .............................................. B32B 1/08
[52] U.S. Cl. ................... 428/36.5; 428/36.1; 428/36.2; 206/317; 206/204; 383/109; 383/113
[58] Field of Search ............ 428/71, 304.4, 311.1, 428/318.4, 319.9, 36.1, 36.5, 102, 36.2; 206/317, 204; 383/109, 113; 604/369

[56] References Cited

U.S. PATENT DOCUMENTS

| | | | |
|---|---|---|---|
| 2,737,136 | 3/1956 | Ryder | 112/262 |
| 3,142,424 | 7/1964 | Reed, Jr. | 224/32 |
| 3,156,351 | 11/1964 | Small | 206/46 |
| 3,437,247 | 4/1969 | Gantress | 224/2 |
| 3,701,371 | 10/1972 | Stackhouse | 150/52 |
| 3,865,166 | 2/1975 | Pedro | 150/52 |
| 4,249,687 | 2/1981 | Warnier | 224/913 |
| 4,257,464 | 3/1981 | Binney | 150/52 |
| 4,463,847 | 8/1984 | Gordon | 206/205 |
| 4,644,987 | 2/1987 | Kiang | 150/52 |
| 4,734,306 | 3/1988 | Lassiter | 428/71 |
| 4,807,303 | 2/1989 | Mann et al. | 2/69 |
| 4,933,231 | 6/1990 | Seber | 422/252 |

*Primary Examiner*—Paul J. Thibodeau
*Assistant Examiner*—David Abraham
*Attorney, Agent, or Firm*—Deveau, Colton & Marquis

[57] ABSTRACT

A three-part laminate material for fabricating protective bags and cases which are used for storing and carrying items and equipment, the three parts being a hydrophilic layer for forming an inner liner which wicks moisture from the item, an open-cell foam middle layer integrally attached to the hydrophilic layer for floatation, impact resistance, and for receiving moisture from the hydrophilic layer, and a hydrophobic outer layer attached to the open-cell foam middle layer for preventing the penetration of liquid water and for allowing water vapor to evaporate therethrough.

17 Claims, 2 Drawing Sheets

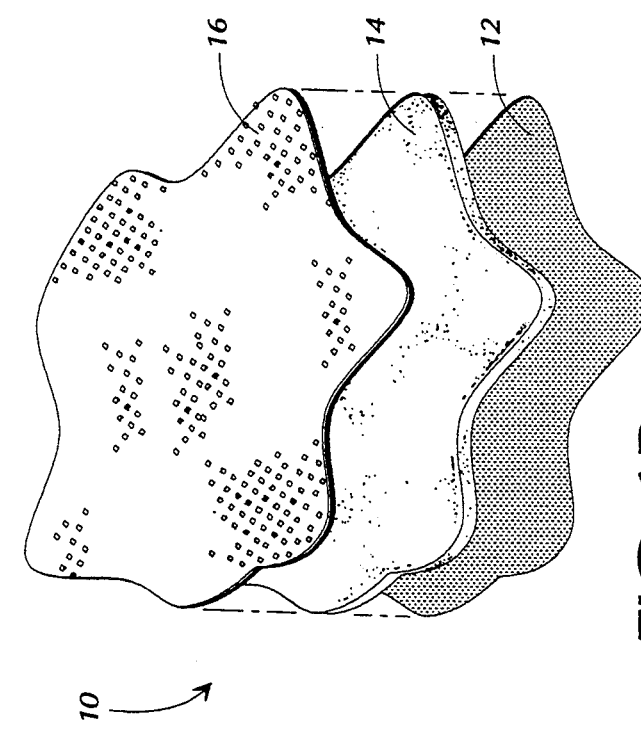
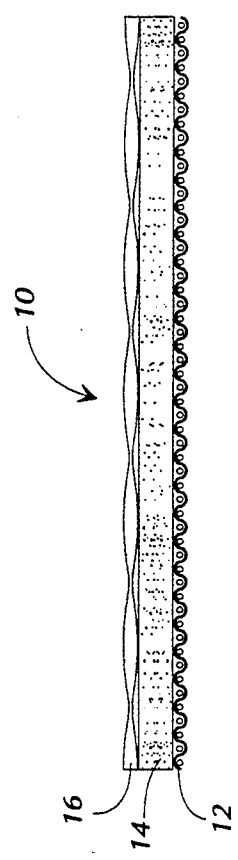
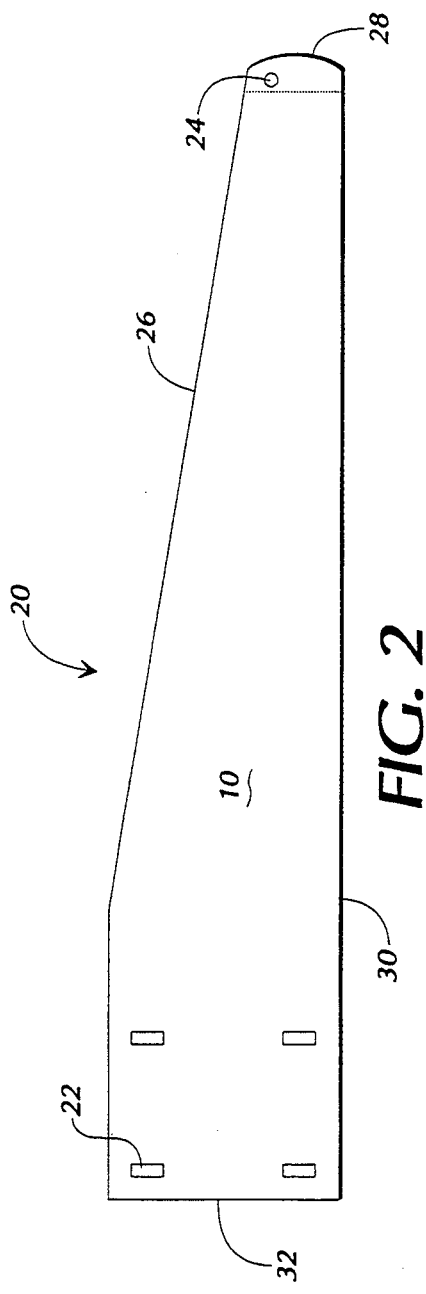

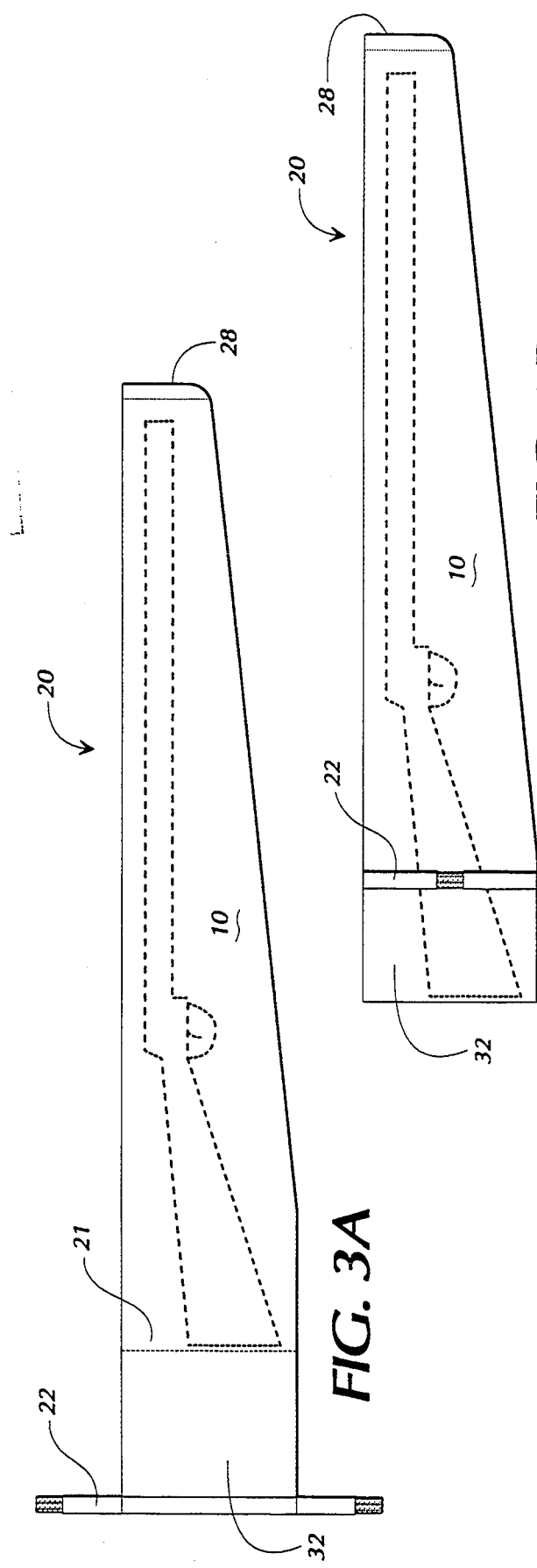
FIG. 3A
FIG. 3B
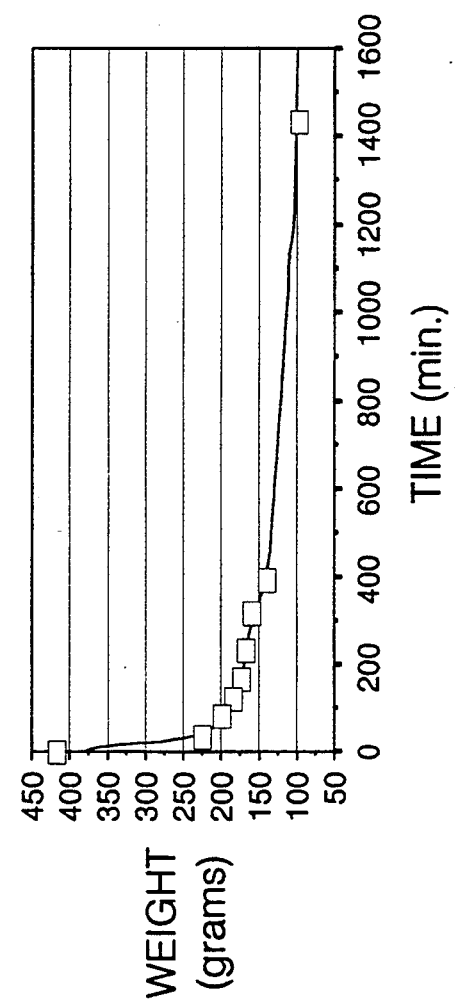
FIG. 4

LAMINATE MATERIAL FOR PROTECTIVE BAGS AND CASES

BACKGROUND OF THE INVENTION

1. Field of the Invention

The invention relates generally to a protective composite material which is impervious to a broad range of hostile or damaging environments, and more particularly to a three-part laminate material for forming protective bags or cases.

2. Description of the Related Art

Bags or cases for carrying and storing equipment such as guns, cameras, video equipment, scientific instruments, military devices and the like, are used under a variety of adverse physical conditions. Depending on the particular device involved, the adverse conditions may include high temperatures, exposure to rain or moisture, exposure to sun rays, and exposure to dust or other particulate pollutants. Prior art cases are typically made of a semi-rigid material which provides protection from impact, water, spray and dust. For example, U.S. Pat. No. Re 33,402 discloses a typical protective carrying case for a video cassette recorder or other electronic device. The carrying case comprises upper and lower halves which are formed of a high-impact material and are integrally coupled to each other. Each of the two halves has a cover means hingedly connected thereto for accessing the cassette door of a video cassette recorder and electrical connections, respectively. Devices such as these generally are bulky and cannot be compacted or folded for storage. Furthermore, these devices tend to trap moisture inside which may corrode or degrade the item being stored. Moreover, semi-rigid cases generally tend to be relatively expensive to manufacture.

Another type of prior art device consists of a protective bag which is made simply of a non-porous plastic film. These bags, for example a polyethylene bag, tend to be more lightweight than the semi-rigid cases and are very compact while providing excellent protection from dust and liquids. However, they provide no impact resistance. Furthermore, these bags trap moisture and permit the interior of the protective bag to become very hot if exposed to direct sunlight, due to a greenhouse effect, which may result in damage to the item stored in the protective bag.

The limitations of the prior art can be shown by an example involving an expensive item such as a video cassette camera. A video camera taken on a small boat on the ocean may be exposed to rain, salt water spray, fine beach sand, heat from the sun, and impact from the abrupt movement of the boat as it encounters ocean waves. A protective case such as the one disclosed in U.S. Pat. No. Re 33,402 might protect the camera from impact but the case is likely to be damaged itself if it becomes saturated with water or is soiled by dirt and grime on the boat. An additional disadvantage is that the protective case of Re 33,402 cannot be compacted for easy stowage. Similarly, a clear plastic bag would provide moisture and dust protection. However, no impact protection would be provided and the bag would become very hot allowing for easy puncturing when the bag is exposed to direct sunlight. Also, the heat generated inside the bag may result in damage to the equipment stored therein. Under such circumstances, neither the plastic bag nor the protective carrying case disclosed in Re 33,402 would be acceptable.

Further, neither the carrying case nor the typical plastic bag would float if the case or bag containing the camera was inadvertently tossed overboard.

U.S. Pat. No. 4,439,473 discloses an open-cell foam coated fabric having a breathable fine cell foam coating adhered to a fabric substrate. This material may be used to form bags and cases of varying sizes and shapes. The foam coating is made of an open-cell foam polymer lattice and a hydrophobic material which coats substantially all of the surfaces of the polymeric lattice and renders the breathable foam coating waterproof. However, the foam coated fabric disclosed in this patent application does not disclose a material which is capable of preventing the accumulation of dust and other fine particles. Rather, both an open-cell foam material and a fabric substrate are especially susceptible to the accumulation of dust.

Because of these and other shortcomings in prior art bags and cases, there is a need for a material for bags and cases which is breathable and water repellent, while still providing protection for the contents of the bag or case by absorbing impact and preventing the accumulation of dust and other unwanted particle accumulations.

BRIEF SUMMARY OF THE INVENTION

The present invention is directed to a composite material which may be used to fabricate protective bags and cases which are lightweight, floatable, and water repellent yet porous. The material is a three-part laminate comprising a two-sided open-cell foam middle or interior layer which has a hydrophilic inner liner integrally attached to one side and a hydrophobic outer shell attached to the other side. Both the hydrophilic liner and the hydrophobic shell are porous; however, the pores of the shell are sized small enough to exclude penetration of liquid water yet allow moisture vapor to be transmitted through the material, while the hydrophilic nature of the liner allows moisture to be wicked away from the surface of an item protected by the bag or case.

The liner and the shell may be formed of a variety of woven or non-woven materials so long as the material selected for the shell is hydrophobic and the material selected for the liner is hydrophilic. For example, the hydrophilic liner may be formed of any material which is capable of readily absorbing water while the hydrophobic shell may be formed of such naturally hydrophobic materials as polypropylene, polyethylene, or polymers which have been treated to make them water repellent. The materials which comprise the three-part laminate of the present invention may be constructed such that the open-cell foam interior layer is positioned between the hydrophilic liner and the hydrophobic shell by any convenient attachment means so long as the means of attachment does not interfere with the functional purposes of the individual layers or the composite of the three layers. Preferably, the hydrophilic liner is integrally attached to the open-cell foam interior layer by a bonding or heat sealing method and the hydrophobic shell is attached to the interior layer by gluing or heat sealing.

Thus, it is an object of the present invention to provide a material for fabricating protective bags and cases which does not allow penetration by liquid water through the material into the bag or case, yet allows moisture vapor to exit the interior of the bag or case.

It is another object of the present invention to provide a material for protective bags and cases which provides water repellency, dust protection, and abrasion protection.

It is yet another object of the present invention to provide a material for fabricating protective bags and cases which is floatable, compressible, and impact resistant.

A further object of the present invention is to provide a material which may be easily formed to make protective bags and cases of varying sizes and shapes so that a broad range of items may be stored or carried therein.

Still another object of the present invention is to provide a material which may be used to make protective bags and cases which are not abrasive to the contents of the bag or case.

Yet another object of the present invention is to provide a low cost material for protective bags and cases which is sufficiently inexpensive to be considered disposable.

These and other objects, features, and advantages of the present invention will become apparent to those skilled in the art upon reading the following specification in conjunction with the accompanying drawing figures, in which like reference numbers denote corresponding parts throughout the several views.

BRIEF DESCRIPTION OF THE DRAWINGS

FIG. 1A is a side view of the three-part laminate material of the present invention.

FIG. 1B is an exploded perspective view of the three-part laminate material of the present invention.

FIG. 2 is a side view of the three-part laminate material depicted in FIG. 1 used to form a disposable rifle case.

FIGS. 3A and 3B are side views of the disposable rifle case of FIG. 2 illustrating a alternate means of closing and sealing the case.

FIG. 4 is a graph depicting the results of a moisture loss test in which the time required for a wet rifle case fabricated from the material of the present invention to return to its original weight was evaluated.

DETAILED DESCRIPTION

As shown in FIGS. 1A and 1B, a three-part laminate protective material 10 for protective bags and cases comprises a two-surfaced open-cell foam middle or interior layer 14, a hydrophilic inner liner 12 integrally attached to a first surface of open-cell foam middle layer 14, and a hydrophobic outer shell 16 attached to a second surface of open-cell foam middle layer 14. The hydrophilic property of liner 12 permits protective material 10 to readily absorb and wick moisture and liquids through one side of the protective material 10, generally the interior of the bag or case, while the hydrophobic property of shell 16 permits protective material 10 to resist and shed moisture and liquids from another side of the protective material 10, generally the exterior of the bag or case. These are desirable characteristics for protective bags and cases which are used for carrying and storage of cameras and other electronic equipment, guns, fishing tackle, clothing, glasses and the like.

Thus designed, hydrophilic liner 12 forms the inner or interior layer of a protective bag or case made of material 10 while hydrophobic shell 16 forms the outer layer of a protective bag or case made of material 10, with the open-cell foam middle layer 14 positioned between hydrophilic liner 12 and hydrophobic shell 16. When a case is made with the material of the present invention, hydrophilic liner 12, being on the inside of the case, wicks away moisture from the case interior, away from the contents of the case, and into the foam middle layer 14. From there, the moisture evaporates as vapor through the hydrophobic shell 16. The hydrophobic shell 16, on the other hand, prevents liquid moisture from entering the foam middle layer 14 and the case.

Liner 12 may be made from a variety of smooth, non-abrasive woven or non-woven fabrics which are porous and hydrophilic. The purpose of liner 12 is to help provide abrasion resistance by preventing external objects from contacting the item protective material 10 is protecting, such as the contents of the bag or case, and to absorb moisture or liquids from the liner 12 side of the protective material 10, such as from the interior of the bag or case. Preferably, liner 12 permits moisture to be wicked away from the contents of a bag or case made of protective material 10 and allows the moisture to be dispersed over a large surface area so as to accelerate the rate at which moisture evaporates through open-cell foam interior layer 14 and hydrophobic shell 16. Because liner 12 is made of a fabric, one may easily slide an item in and out of a protective bag or case made of protective material 10 without damaging the item. Hydrophilic liner 12 is preferably made of nylon tricot. However, any material having the characteristics described above is acceptable including, for example, woven or non-woven fabrics comprised of synthetic, natural or mixtures of synthetic and natural fibers, including, for example, nylon, rayon, polyester, cotton, wool, thermoplastic fibers, fiberglass fabrics, and the like.

Open-cell foam interior layer 14 may be any open-cell foam. Preferably, layer 14 comprises a foam with large open cells which are hydrophilic. Large open cells provide higher water vapor transmission rates which accelerates drying from the inside of a protective bag or case made of protective material 10 to the outside of the bag or case. Also, the large open cells of layer 14 are more compressible than a fine-cell foam making it easier to store protective bags or cases made of the protective material 10 in a small container or pocket. The hydrophilic nature of the preferred material of layer 14 assists in wicking moisture over a large surface area which further accelerates the drying of protective material 10. Open-cell foam interior layer 14 also protects the contents of a bag or case made of protective material 10 from impact and abrasion while also providing flotation should the contents of the bag or case be inadvertently dropped in a body of water. Open-cell foam interior layer 14 may be made of any natural or synthetic polymer, or combination thereof, which is foamable and capable of being cured so as to form an open-cell foam structure, including, for example, latex, polyurethane, polypropylene, isoprene, neoprene, and the like.

Hydrophobic shell 16 may be made from a woven or non-woven fabric which is hydrophobic and has a sufficiently small pore size (microporous) to prevent penetration of water, while allowing the passage of water vapor. The pores of shell 16 are selected so that protective material 10, as a whole, may be both hydrophobic and hydrophilic depending on the side presented. Thus, shell 16 is porous enough to allow evaporation of moisture through it from the inside out, yet hydrophobic enough to prevent liquid moisture from traveling from the outside in. This combination of properties makes a protective bag or case made from protective material 10 water repellent, yet allows water vapor trapped inside the bag or case to escape. The fabric which may be used to form shell 16 may be made from the group of naturally hydrophobic polymers, which include polypropylene and polyethylene, or from polymers which have been treated to make them hydrophobic. Melt-blown polypropylene and spun-bonded polyethylene (i.e., Tyvek ®) are examples of naturally hydrophobic nonwoven fabrics. However, there are many other fabrics which are suitable so long as they satisfy the criteria discussed above. Thus, shell 16 provides water repellancy, dust protection and abrasion protection.

Thus described, the present invention provides a three-part laminate material for protective bags and cases which is lightweight, flexible and water repellent, yet water vapor permeable, abrasion resistant, impact resistant and buoyant. Also, the cost of materials for constructing the material of the present invention is sufficiently low that bags or cases manufactured therefrom may be regarded as disposable. Moreover, since the material of the present invention is preferably made entirely from synthetic polymers, it is recyclable.

FIG. 2 shows a side view of a preferred embodiment of the laminate material of the present invention in the form of a disposable rifle case 20. Rifle case 20 comprises an elongated bag made of the material 10 of the present invention which is sealed on three sides 26, 28, 30. A fourth side or open end 32 is left open for the insertion of a rifle and provided with a water resistant closure with fastening means 22. The open end 32 of rifle case 20 is secured by folding it over or by rolling open end 32 in the direction of closed end 28 and securing open end 32 with fastening means 22 so that the rifle case is sealed.

Rifle case 20 is preferably assembled by spraying glue on the exposed foam side of a preassembled laminate of liner material 12 and open cell foam material 14. A layer of shell material 16 is then brought into contact with the glue to form the three-part laminate material 10 of the present invention with foam layer 14 positioned between liner 12 and shell 16. The composite material 10 of the present invention is then cut into the proper shape or pattern so as to form a rifle case after proper assembly. A strip of glue is then applied around the perimeter or outer portion of the shell material 16 of the patterned cut material 10 leaving the portion which will form the open end 32 of the rifle case unglued. Material 10 is then folded over to form an elongated bag, with the glued portions contacting each other. At this point, the bag is inside out. Next, the glued portion is preferably sewn together to further waterproof the seam. Sewing also provides strength to the seam and gives the edge an attractive finish. Alternatively, a heat sealing or bonding method may be used to seal the rifle case. The case is then turned inside out so the shell 16 is facing outwardly and the liner 12 is facing inwardly. After the rifle case has been properly sealed, closures, fasteners, straps, labels and other devices may be attached to the case.

FIGS. 3A and 3B illustrate an alternate preferred fastening means for closing the open end of rifle case 20. A flat strap of nylon webbing, preferably about ¾ inch wide and 15 inches long is sewn to one side of the open end 32 of rifle case 20. A portion of hook and loop closure material 40, such as Velcro ® is then fastened to each end of the strap. To close the case, the open end 32 of rifle case 20 is rolled or folded over at least once, then folded down over the butt of the rifle at fold line 21. The straps can then be wrapped around the entire case and secured with the hook and loop fasteners 40. The fastening means illustrated in FIGS. 3A and 3B is preferable. However, other fastening means may be used to close the open end 32 of the case including, for example, an adjustable length buckle, a zipper, or a zip-lock closure. The method of closing the open end 32 of rife case 20 illustrated in FIGS. 3A and 3B, however, allows the length of rifle case 20 to be adjusted for varying lengths of rifles or other products which will be stored in the case. For example, when the embodiment of the present invention is in the form of a rifle case, the rifle case may be constructed so that it is long enough to accommodate the longest rifles which are anticipated to be stored within the case while permitting the open end of the rifle case to be adjusted for shorter rifles, guns and other products. The finished three-part laminate material 10 may range from about ⅛ inch to ⅜ inch thick, preferably 5/16 inch thick with foam layer 14 providing most of the bulk of the material. It will be clear to those skilled in the art that the three-part laminate material 10 of the present invention and bag or cases made therefrom may be made in various lengths, widths, and thicknesses to fit products of varying sizes and shapes, such as guns, knives, cameras, tools, ski bags and other sporting and athletic equipment.

Various reinforcing means may be provided for use in combination with a bag or case made of the material of the present invention. For example, reinforcing plastic or wood may be used at the edges or end of the bag to prevent puncturing of the bag or case where the contents of the bag or case is sharp or pointed. In the embodiment of the present invention shown in FIG. 2, a plastic cap 24 may be mounted in rifle bag 20 at closed end 28 to prevent the case from being punctured by the rifle or shotgun barrel. Plastic cap 24 is preferably mounted to rifle case 20 by gluing it to liner 12. However, any other appropriate means may be used so long as the structural integrity of the rifle case is maintained.

When not in use, the entire rifle case 20 may be rolled or folded into a small packet and secured with the same fastening means 22 which are used to secure open end 32. The rifle case 20 may then be stored in a large pocket of a hunting jacket or a storage bag, for example. Optionally, rifle case 20 may be fitted with a clip (not shown) for attachment of the folded rifle case to a belt and a sling or handles (not shown) for carrying the rifle case.

Hydrophilic liner 12 wicks moisture away from the surface of a rifle or other product stored in the case and thereby inhibits rust formation or other fouling if the product is made of an oxidizable material, or is amenable to sogging or mildewing, etc. Liner 12 also spreads the wicked moisture over a large surface area which accelerates evaporation of moisture from inside the rifle case 20. The bulk of open-cell foam interior layer 14 displaces a sufficient amount of water to allow the case and contents to float should it be dropped in a body of water. In the gun case embodiment, layer 14 is made of open-cell polyethylene foam which is heat laminated to liner 12 which is preferably made of a woven nylon tricot material. In this embodiment, shell 16 is made of spun-bonded high-density polyethylene fibers (i.e., Tyvek ®). A preferred embodiment for using the material 10 of the present invention is in the form of a rifle case 20 which is disposable in that it is intended for use in the field and its intended cost is so low that it may be discarded when it becomes soiled or worn. Additionally, in this embodiment, material 10 may be printed or dyed with a camouflage pattern for effective use by hunters.

As a means of demonstrating the effectiveness of the material of the present invention, several tests were performed on the preferred embodiment of the present invention in the form of a rifle case. These tests included a flotation test and a moisture loss test in which the time required for the material to dry was evaluated. The three-part laminate material used to fabricate the rifle case which was tested comprised ⅛" polyethylene foam which had nylon tricot fabric flame laminated to one side and Tyvek ® 1443R attached to the other side by spraying the foam with glue from an air gun and pressing the Tyvek ® in place against the foam until dry. This three-part laminate material was formed into a rifle case which measures 48" long by 10" wide at one end and 5" wide at the other end with the width tapering from 10" to 5" to fit the general shape of a rifle as shown in FIG. 2. The fabricated rifle case had an overall thickness of approximately ¾" thick and an initial dry weight of 98 grams.

The rifle case 20 was saturated by filling it with water at open end 32. Water was soaked into the liner and foam layers. The water was then poured out of the case which was then rolled and squeezed to remove as much water as possible. Rifle case 20 was then closed at its open end 32 with fastening means 22 so that the rifle case was sealed. The case was then hung up to dry in a room with still air.

The results of the moisture loss test are indicated in the chart below and in FIG. 4. As indicated, the initial weight of the rifle case, once it was hung to dry, was 417 grams. The case was then weighed at random intervals using a triple beam balance. The chart below and the graph of FIG. 4 show the weight of the rifle case in grams versus the drying time in minutes over the duration of the moisture loss test. The chart below also shows the temperature and relative humidity recorded each time the weight of the rifle case was measured. The test indicates that it took approximately 24 hours for the rifle case to dry to its original weight. As the case was closed, drying occurred by wicking through the hydrophilic liner 12 and foam layer 14 and by evaporation of the moisture through the porous hydrophobic shell 16.

| MOISTURE LOSS TEST | | | |
| --- | --- | --- | --- |
| Elapsed Time (minutes) | Weight (grams) | Temperature (Degrees Fahrenheit) | Relative Humidity (percent) |
| 0 | 417 | 67 | 42 |
| 37 | 226 | 67 | 42 |
| 84 | 199 | 67 | 42 |
| 122 | 185 | 68 | 42 |
| 171 | 173 | 69 | 42 |
| 237 | 168 | 71 | 42 |
| 322 | 160 | 74 | 38 |
| 397 | 140 | 73 | 38 |
| 1432 | 96 | 67 | 40 |

A rifle case identical to the one described above in connection with the moisture loss test was used in a floatation test. A 20 gauge shotgun weighing 2.92 kilograms was inserted in the case which was then closed and placed in a tub of water for a period of 10 hours. The case floated horizontally on the water for the entire period. At the end of the 10 hours the case was opened and observed for moisture content. No moisture was seen on the gun and no moisture could be seen or felt on the liner of the case. Thus, the floatation test demonstrates that a bag or case constructed from the material of the present invention is waterproof and provides flotation for the contents of the bag or case. The waterproof feature is primarily provided by hydrophobic shell 16 in that its microporous structure prevents liquid water from entering the interior of the bag or case. Foam layer 14 is the primary element of the present invention which provides floatation because the bulk of its large open cell construction readily displaces water. Accordingly, the material of the present invention displays excellent performance when used to fabricate protective bags and cases which may be exposed to a variety of environments which may be damaging to the contents of the bag or case.

Although the present invention has been described in considerable detail with reference to a preferred embodiment in the form of a rifle case, other versions are possible. For example, the three-part laminate material of the present invention may be used alone as a protective covering or in the form of protective bags and cases for such items as cameras, calculators, audio and video cassette recorders and other electronic devices, clothing, glasses and fishing tackle. Therefore, the above-detailed description of the preferred embodiment is for illustrative purposes only and is not meant to limit the spirit and scope of the invention and its equivalents as defined by the appended claims.

What is claimed is:

1. A three-part laminate material for use in fabricating bags and cases, the material comprising a hydrophilic inner layer, a hydrophobic outer layer, and a middle layer positioned between said inner layer and said outer layer, wherein
    said inner layer comprises a hydrophilic material having a wicking quality which wicks moisture or liquids contacting said inner layer through said inner layer and into said middle layer;
    said middle layer comprises an open-cell foam material which absorbs moisture or liquid from said inner layer into said middle layer; and
    said outer layer comprises a moisture resistant material which prevents transmission of liquid moisture through said outer layer to said middle layer and permits moisture or liquid within said middle layer to evaporate from said middle layer through said outer layer as vapor;
    said three-part laminate material being formed by gluing said hydrophobic outer layer to a laminate of said hydrophilic inner layer and said middle layer wherein said hydrophilic inner layer and said hydrophobic outer layer are continuously and integrally attached to said middle layer.

2. The material as recited in claim 1, wherein said hydrophilic inner layer comprises a fabric selected from the group consisting of nylon, nylon tricot, rayon, polyester, cotton, wool, thermoplastic fibers and fiberglass fabrics.

3. The material as recited in claim 1, wherein said hydrophilic inner layer is a nylon tricot.

4. The material as recited in claim 1, wherein open-cell foam middle layer comprises a polymer selected from the group consisting of latex, polyurethane, polypropylene, isoprene, and neoprene.

5. The material as recited in claim 1, wherein said hydrophobic outer layer is a polymer which has been treated to make said polymer hydrophobic.

6. The material as recited in claim 1, wherein said hydrophobic outer layer is a naturally hydrophobic polymer.

7. A bag or case made of a three-part laminate material for storing and carrying an item, the material comprising:
- a water and moisture absorbing hydrophilic inner layer formed of a soft, non-abrasive fabric for placement against a surface of the item;
- a floatable, impact resistant, open-cell foam middle layer continuously and integrally attached to said hydrophilic layer for receiving moisture from said hydrophilic inner layer; and
- a water repellent hydrophobic outer layer continuously and integrally attached to said open-cell foam middle layer and having pores of a sufficiently small size for allowing moisture to evaporate from said open-cell foam middle layer into and through said hydrophobic outer layer as a vapor, and for preventing liquid moisture from entering said open-cell foam middle layer from outside the bag or case whereby the contents of the bag or case remains relatively dry.

8. The bag or case as recited in claim 7, comprising an elongate enclosure for storing and carrying a rifle, said enclosure comprising a sheet of the three-part laminate, said enclosure having at least one sealed portion and at least one open portion for receiving the rifle.

9. The bag or case as recited in claim 7, further comprising a fastening means attached to said open portion of said enclosure for sealing the item in said enclosure.

10. The bag or case as recited in claim 9, wherein said fastening means is fabric closure of the hook and loop type.

11. The bag or case as recited in claim 10, further comprising a reinforcing means for preventing puncturing of the bag or case by the item stored or carried therein.

12. The bag or case as recited in claim 11, further comprising a reinforcing cap mounted in said bag or case for preventing puncturing of said bag or case by the item.

13. The bag or case as recited in claim 8, wherein said at least one sealed portion is sealed with an adhesive defining a glued portion.

14. The bag or case as recited in claim 13, wherein said glued portion is reinforced with sewn threads.

15. The bag or case as recited in claim 8, wherein said at least one sealed portion is sealed by a heat sealing method.

16. A three-part laminate material for use in fabricating bags and cases, the material comprising a hydrophilic inner layer, a hydrophobic outer layer, and a middle layer positioned between said inner layer and said outer layer, wherein
- said inner layer comprises a hydrophilic material having a wicking quality which wicks moisture or liquids contacting said inner layer through said inner layer and into said middle layer;
- said middle layer comprises an open-cell foam material which absorbs moisture or liquid from said inner layer into said middle layer; and
- said outer layer comprises a moisture resistant material which prevents transmission of liquid moisture through said outer layer to said middle layer and permits moisture or liquid within said middle layer to evaporate from said middle layer through said outer layer as vapor;
- said three-part laminate material being formed by heat sealing said hydrophobic outer layer to a laminate of said hydrophilic inner layer and said middle layer wherein said hydrophilic inner layer and said hydrophobic outer layer are continuously and integrally attached to said middle layer.

17. The material as recited in claim 16, wherein said hydrophilic inner layer comprises a fabric selected from the group consisting of nylon, nylon tricot, rayon, polyester, cotton, wool, thermoplastic fabrics, and fiberglass fabrics; said middle layer comprises a polymer selected from the group consisting of latex, polyurethane, polypropylene, isoprene, and neoprene; and said hydrophobic outer layer comprises a material selected from the group consisting of polymers which have been treated to make said polymers hydrophobic, and naturally hydrophobic polymers.

* * * * *